(12) United States Patent
Lin et al.

(10) Patent No.: US 8,985,826 B2
(45) Date of Patent: Mar. 24, 2015

(54) BACKLIGHT MODULE HAVING OPTCIAL FIBER

(71) Applicant: Advanced Optoelectronic Technology, Inc., Hsinchu Hsien (TW)

(72) Inventors: Hou-Te Lin, Hsinchu (TW); Chao-Hsiung Chang, Hsinchu (TW)

(73) Assignee: Advanced Optoelectronic Technology, Inc., Hsinchu Hsien (TW)

( * ) Notice: Subject to any disclaimer, the term of this patent is extended or adjusted under 35 U.S.C. 154(b) by 24 days.

(21) Appl. No.: 13/714,311

(22) Filed: Dec. 13, 2012

(65) Prior Publication Data

US 2013/0229822 A1    Sep. 5, 2013

(30) Foreign Application Priority Data

Mar. 2, 2012   (CN) .......................... 2012 1 0052861

(51) Int. Cl.
| | |
|---|---|
| F21V 7/04 | (2006.01) |
| G02B 7/02 | (2006.01) |
| G05D 25/00 | (2006.01) |
| G02B 26/02 | (2006.01) |
| G02F 1/1335 | (2006.01) |

(52) U.S. Cl.
CPC .... *G02B 26/02* (2013.01); *G02F 2001/133601* (2013.01)
USPC ............................ 362/552; 362/551; 362/511

(58) Field of Classification Search
USPC ......... 365/511, 551–552, 554–556, 559, 561; 362/511, 551–552, 554–556, 559, 561, 362/610, 615
See application file for complete search history.

(56) References Cited

U.S. PATENT DOCUMENTS

| | | | | |
|---|---|---|---|---|
| 4,435,064 | A * | 3/1984 | Tsukada et al. | 355/1 |
| 4,650,280 | A * | 3/1987 | Sedlmayr | 385/120 |
| 5,053,765 | A * | 10/1991 | Sonehara et al. | 340/815.43 |
| 5,684,620 | A * | 11/1997 | Schoon | 359/298 |
| 5,765,934 | A * | 6/1998 | Okamori et al. | 353/94 |
| 5,838,865 | A * | 11/1998 | Gulick | 385/121 |
| 6,854,869 | B1 * | 2/2005 | Fernandez | 362/488 |
| 6,908,204 | B2 * | 6/2005 | Kraft | 362/628 |
| 7,177,097 | B2 * | 2/2007 | Lim et al. | 359/709 |
| 7,268,942 | B2 * | 9/2007 | Kuo | 359/443 |
| 7,357,548 | B2 * | 4/2008 | Haenen et al. | 362/551 |
| 7,645,054 | B2 * | 1/2010 | Goihl | 362/244 |
| 7,658,526 | B2 * | 2/2010 | Henson et al. | 362/554 |
| 7,959,341 | B2 * | 6/2011 | Erchak et al. | 362/612 |

(Continued)

FOREIGN PATENT DOCUMENTS

WO    2011142455 A1   11/2011

*Primary Examiner* — Nimeshkumar Patel
*Assistant Examiner* — Jose M Diaz
(74) *Attorney, Agent, or Firm* — Novak Druce Connolly Bove + Quigg LLP

(57) ABSTRACT

A backlight module includes a back cover, a light source located on the back cover, an optical fiber located on the back cover and over the light source and having a light-incident hole facing the light source and a plurality of light-emergent windows opposite to the light-incident hole. A plurality of light shutters correspondingly covers the light-emergent windows. A controlling device is provided for controlling the open and close of the light shutters. Light emitted from the light source and entering the optical fiber is permitted to leave the optical fiber from the light-emergent windows whose light shutters are opened. The light is not permitted to leave the optical fiber from the light-emergent windows whose light shutters are closed.

19 Claims, 6 Drawing Sheets

(56) References Cited

U.S. PATENT DOCUMENTS

| | | | |
|---|---|---|---|
| 8,139,202 B2* | 3/2012 | Henningsen | 355/71 |
| 8,308,329 B1* | 11/2012 | Sethna | 362/554 |
| 8,333,494 B2* | 12/2012 | Kanade et al. | 362/511 |
| 8,469,562 B2* | 6/2013 | Marzorati et al. | 362/488 |
| 8,562,195 B2* | 10/2013 | Masuko | 362/581 |
| 8,845,162 B2* | 9/2014 | Shakespeare et al. | 362/551 |
| 8,851,701 B2* | 10/2014 | Van Herpen | 362/153 |
| 2006/0291203 A1* | 12/2006 | Anandan | 362/231 |
| 2007/0171330 A1* | 7/2007 | Hung et al. | 349/65 |
| 2009/0161378 A1* | 6/2009 | Enz | 362/494 |
| 2010/0026929 A1* | 2/2010 | Nagata et al. | 349/61 |
| 2010/0220492 A1* | 9/2010 | Richardson | 362/551 |
| 2011/0216286 A1* | 9/2011 | Matsumoto et al. | 353/52 |
| 2012/0320615 A1* | 12/2012 | Englert | 362/511 |
| 2013/0027675 A1 | 1/2013 | Natsumeda et al. | |
| 2013/0114277 A1* | 5/2013 | Faffelberger | 362/511 |
| 2013/0194816 A1* | 8/2013 | Hager et al. | 362/487 |
| 2013/0322104 A1* | 12/2013 | Baert et al. | 362/511 |

\* cited by examiner

BACKLIGHT MODULE HAVING OPTCIAL FIBER

BACKGROUND

1. Technical Field

The disclosure relates to a backlight module and, more particularly, relates to an LED backlight module having an optical fiber for dispersing light from an LED thereof.

2. Description of Related Art

With progress in electronic technology and the popularization of portable electronic devices in daily life, demands for display of light weight and low power consumption have been increased. Therefore, liquid crystal display (LCD) has gradually replaced the cold cathode-ray tube (CRT) display in modern information products such as portable computers, mobile phones and personal digital assistants (PDAs), based on its advantages of low power consumption, low heat emission, light weight and non-radiation. Because liquid crystal displays are not self-illuminant, backlight modules are provided to illuminate the displays.

A conventional backlight module includes a flat back cover and a plurality of light-emitting diodes (LEDs) mounted on the back cover in array. To decrease a cost of the backlight module, the number of the light-emitting diodes is reduced to the minimum. Under this requirement, each of the light-emitting diodes should have an illumination angle as large as possible. To achieve this objective, an optical lens is usually required to be placed in front of the LED. The lens however increases the cost and thickness of the backlight module.

What is needed, therefore, is an improved backlight module which can resolve the above-described problems.

DETAILED DESCRIPTION

Figure 1:
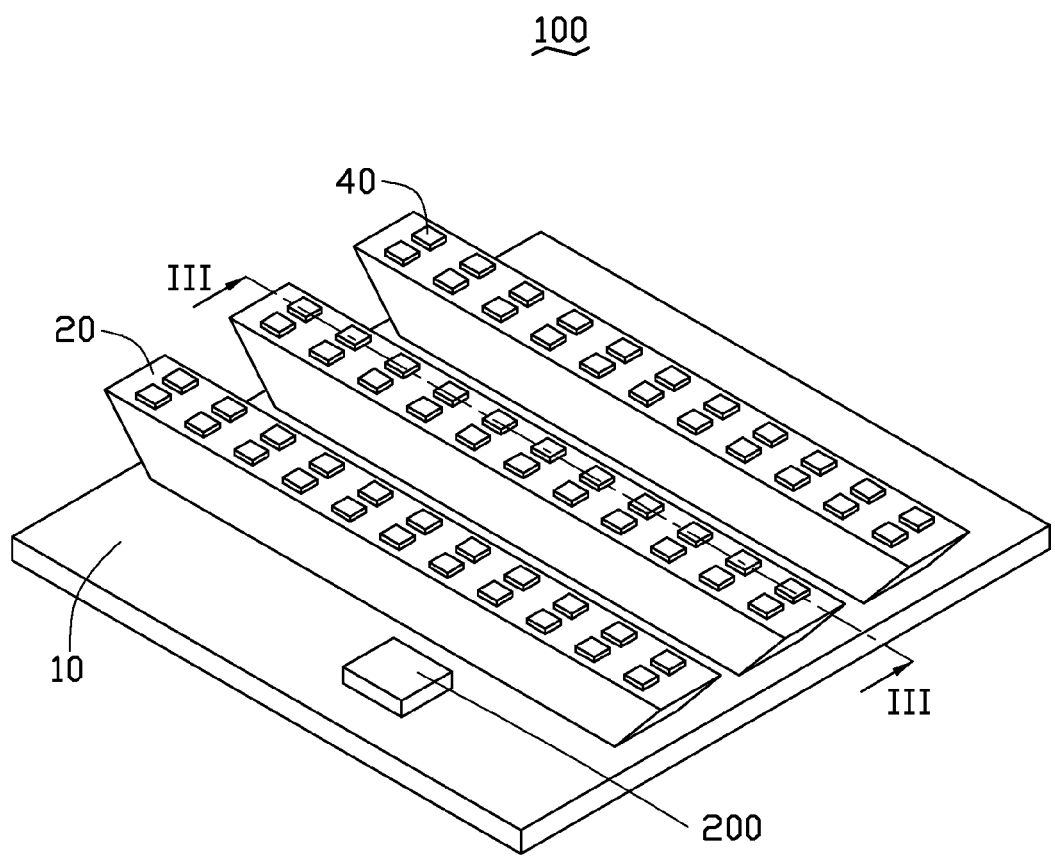
FIG. 1 is an isometric, assembled view of a backlight module according to a first embodiment of the present disclosure.
Figure 2:
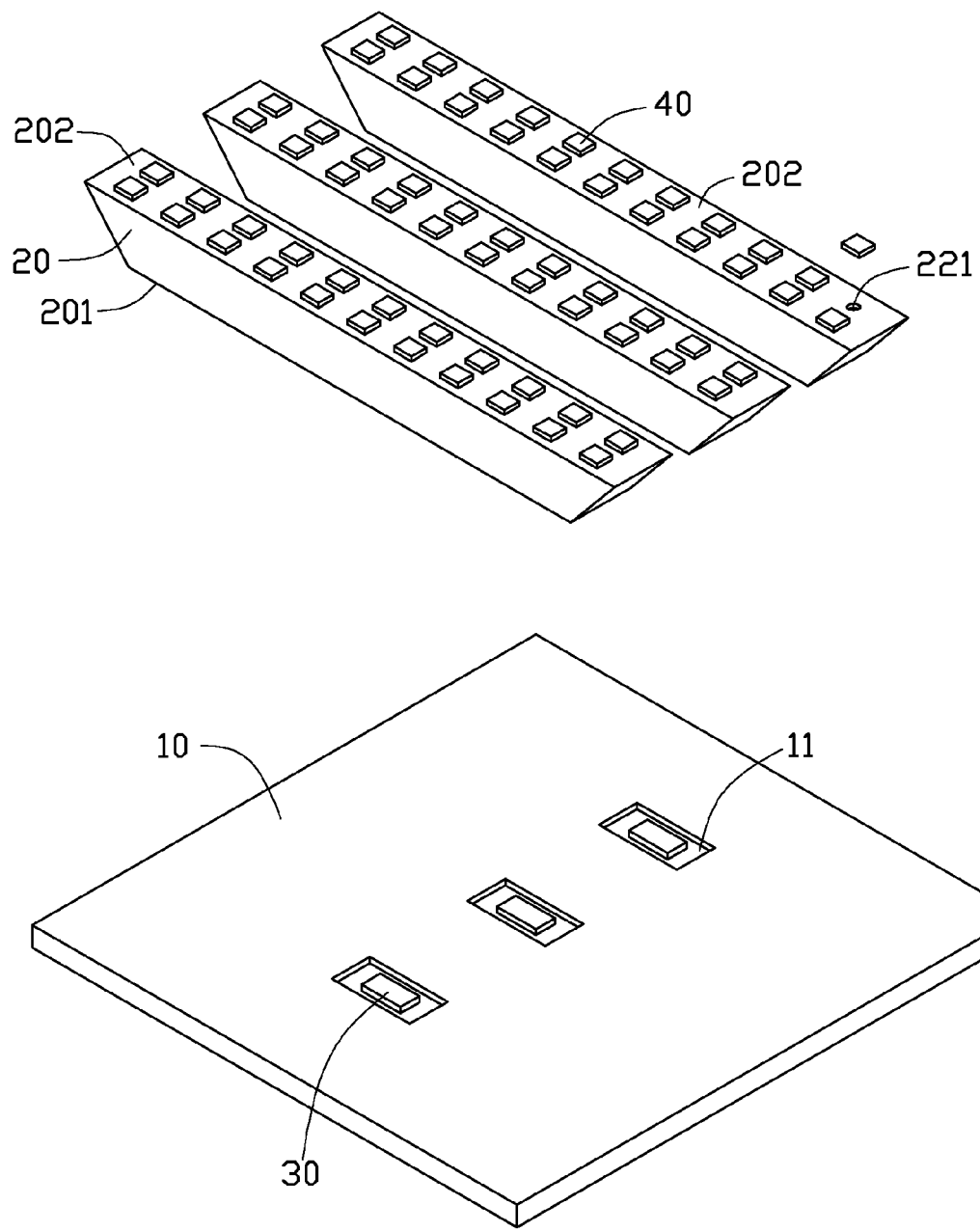
FIG. 2 is an exploded view of the backlight module of FIG. 1.

Referring to FIGS. 1 and 2, a backlight module 100 in accordance with a first embodiment is illustrated. The backlight module 100 comprises a back cover 10, three optical fibers 20 located on the back cover 10, and three light sources 30 mounted in the back cover 10.

The back cover 10 is rectangular and made of good heat-conducting material, such as metal or ceramics, for dissipating heat generated by the light source 30. Three receiving grooves 11 are defined in a top face of the back cover 10. Each light source 30 is correspondingly accommodated in a receiving groove 11.

Figure 3:
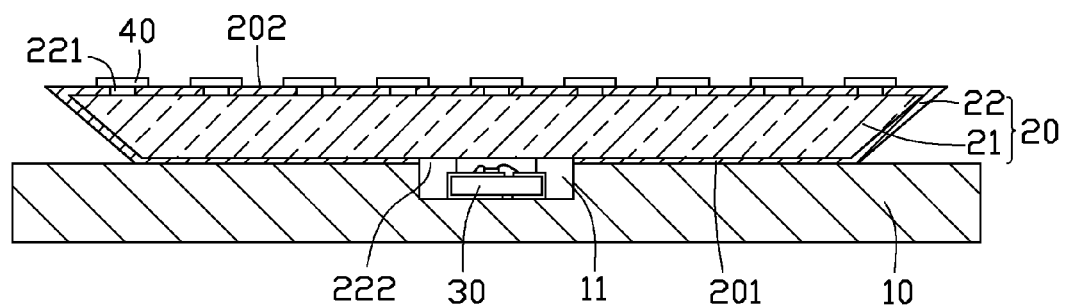
FIG. 3 is a cross-sectional view of the backlight module of FIG. 1, taken along line thereof.

Referring to FIG. 3 also, each optical fiber 20 comprises a main body 21 and a coating layer 22 entirely coating an outer periphery of the main body 21. Each optical fiber 20 has a configuration like an inverted quadrangular frustum. The optical fibers 20 are spaced from and parallel to each other. A bottom face 201 of each optical fiber 20 is attached on the top face of the back cover 10 and correspondingly faces a light source 30. A top face 202 of each optical fiber 20 is larger than the bottom face 201 of the optical fiber 20. A plurality of light-emergent windows 221 are formed in the top face 202 of each optical fiber 20. The light-emergent windows 221 are arranged in a matrix. In this embodiment of the present disclosure, the light-emergent window 221 is formed in and extends through the coating layer 22 of the optical fiber 20. A light-incident hole 222 is formed in the bottom face 201 of the each optical fiber 20. The light-incident hole 222 is formed in and extends through the coating layer 22 of the optical fiber 20. The light-incident hole 222 is positioned corresponding to the light source 30.

The back light module 100 further comprises a plurality of light shutters 40. Each light shutter 40 correspondingly covers a light-emergent window 221. The light shutters 40 are electrically connected to a controlling device 200. The controlling device 200 is used for controlling the light shutters 40 to open or close to control the light to emit from the light-emergent windows 221. The light from the light source 30 is permitted to emit from optical fiber 20 via the light-emergent windows 221 whose light shutters 40 are opened, while not permitted to emit from the optical fiber 20 via the light-emergent windows 221 whose light shutters 40 are closed. By the provision of the light shutters 40, the intensity of the light emitted from the optical fiber 20 is adjustable thereby to control the brightness of the display of the LCD module incorporating the backlight module 100.

Each light source 30 is an LED (light emitting diode). The light source 30 could have a specific light wavelength range to emit a light with a predetermined color, or emit a mixture of the lights with different wave lengths thereby obtaining a light with a desired color such as white. The light emitted from the light source 30 firstly passes through the light-incident hole 222 of the corresponding optical fiber 20, then is reflected multiple times in the main body 21 of the optical fiber 20 by the coating layer 22, and finally is ejected outwardly from the light-emergent windows 221 of the optical fiber 20 whose light shutters 40 are opened. Being adjusted by the optical fiber 20, the light emitted from the light source 30 could be effectively distributed over a large range.

Figure 4:
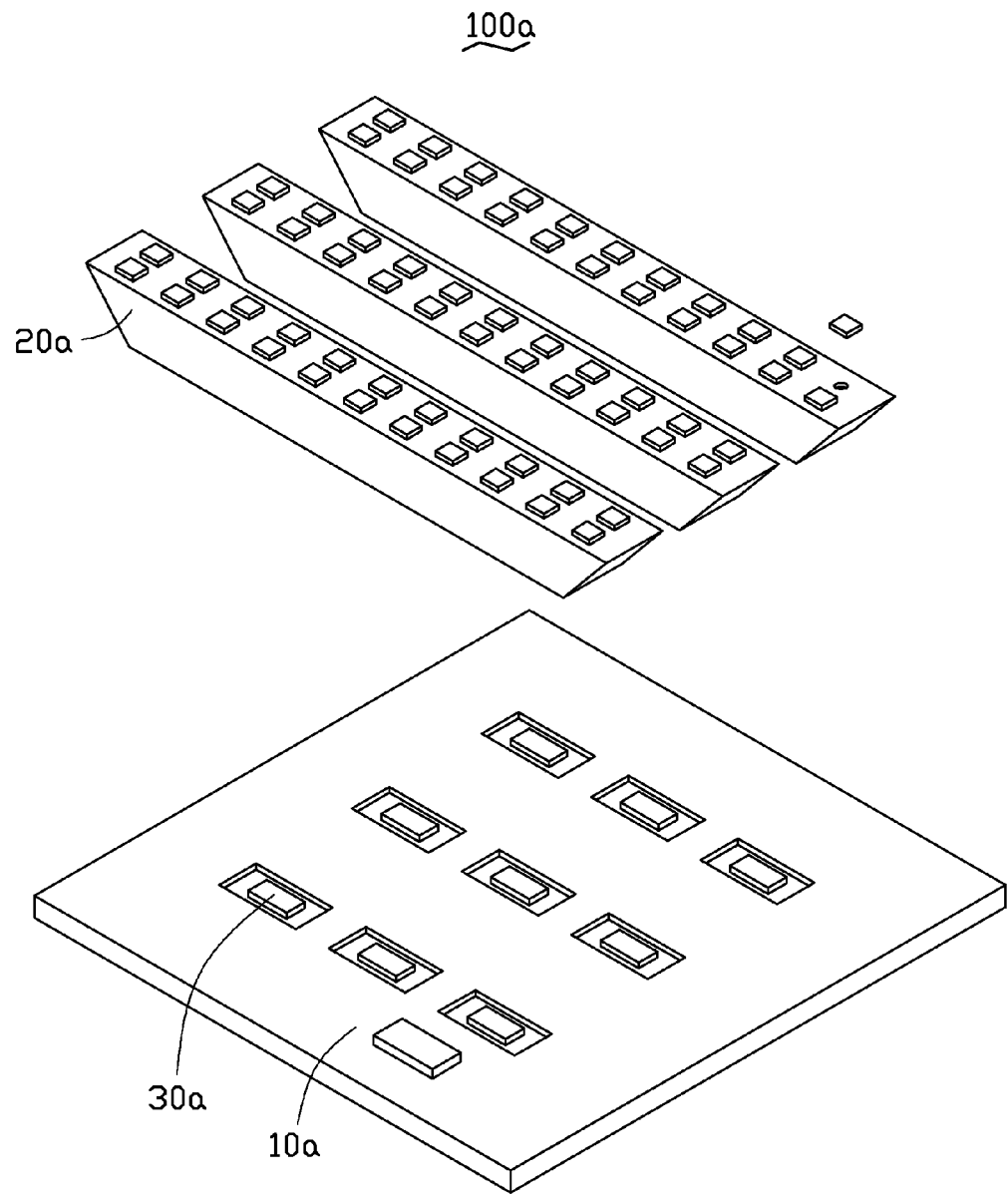
FIG. 4 is an exploded view of a backlight module according to a second embodiment of the present disclosure.
Figure 5:
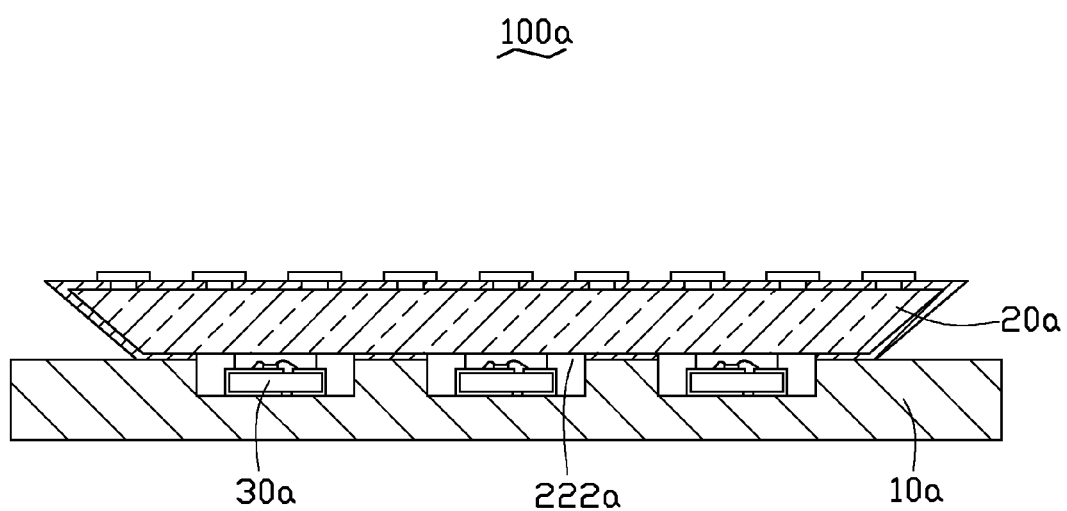
FIG. 5 is a cross-sectional view of the backlight module of FIG. 4.

Referring to FIGS. 4 and 5 also, a backlight module 100a in accordance with a second embodiment is shown. The backlight module 100a is mostly similar to the backlight module 100. In this embodiment, differing from the first embodiment, the backlight module 100a comprises a back cover 10a, three optical fibers 20a, and three light sources 30a mounted in the back cover 10a and located between each optical fiber 20a and the back cover 10a. In this embodiment, there are three light-incident holes 222a in a bottom of the optical fiber 20a corresponding to the light sources 30a. Each light source 30 could have a specific light wavelength range to emit a light with a predetermined color, whereby a mixture of the lights with different wave lengths is obtained in the optical fiber 20a, and a light with a desired color, such as white, is attainable.

Figure 6:
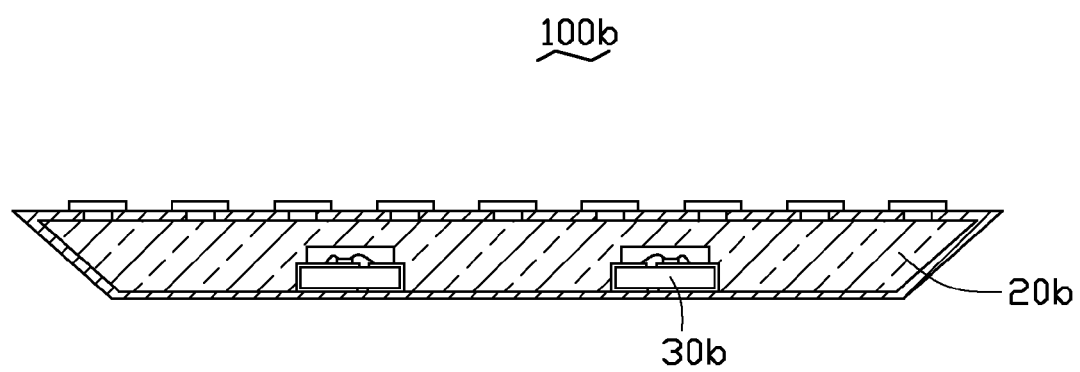
FIG. 6 is a cross-sectional view of a backlight module according to a third embodiment of the present disclosure.

Referring to FIG. 6 also, a backlight module 100b in accordance with a third embodiment is shown. The backlight module 100b is mostly similar to the backlight module 100a. In this embodiment, differing from the second embodiment, the backlight module 100b comprises an optical fiber 20b and a plurality of light sources embedded into the optical fiber 20b.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A backlight module comprising:
   a back cover;
   a light source located in the back cover;
   an optical fiber located on the back cover and over the light source, the optical fiber having a light-incident hole facing the light source and a plurality of light-emergent windows opposite to the light-incident hole;
   a plurality of light shutters correspondingly covering the light-emergent windows; and
   a controlling device being configured for controlling the light shutters to open or close, wherein light emitted from the light source and entering the optical fiber is permitted to leave the optical fiber via the light-emergent windows whose light shutters are opened and not permitted to leave the optical fiber via the light-emergent windows whose light shutters are closed, a bottom face of the optical fiber is attached on a top face of the back cover and correspondingly faces the light source.

2. The backlight module as described in claim 1, wherein the light-incident hole is defined in a bottom face of the optical fiber, and the light-emergent windows are defined in a top face of the optical fiber.

3. The backlight module as described in claim 2, wherein the top face of the optical fiber is larger than the bottom face of the optical fiber.

4. The backlight module as described in claim 2, wherein the optical fiber has a configuration like an inverted quadrangular frustum.

5. The backlight module as described in claim 1, wherein a receiving groove is defined in a top face of the back cover for accommodating the light source therein.

6. The backlight module as described in claim 1, wherein the light-emergent windows are arranged in a matrix.

7. The backlight module as described in claim 1, wherein the optical fiber comprises a main body and a coating layer entirely coating an outer periphery of the main body.

8. The backlight module as described in claim 7, wherein the light-incident hole and the light-emergent windows are both defined in and extends through the coating layer of the optical fiber.

9. The backlight module as described in claim 8, wherein the light emitted from the light source firstly passes through the light-incident hole of the optical fiber, then is reflected in the main body of the optical fiber by the coating layer, and is finally ejected outwardly from the light-emergent windows of the optical fiber whose light shutters are opened.

10. A backlight module comprising:
    a back cover;
    a plurality of light sources located on the back cover;
    an optical fiber located on the light source, the optical fiber having a plurality of light-incident holes correspondingly facing the light sources and a plurality of light-emergent windows opposite to the light-incident holes;
    a plurality of light shutters correspondingly covering the light-emergent windows; and
    a controlling device being configured for controlling the light shutters to open or close, wherein light emitted from the light sources and entering the optical fiber is permitted to leave the optical fiber via the light-emergent windows whose light shutters are opened and not permitted to leave the optical fiber via the light-emergent windows whose light shutters are closed, each light source has a specific light wavelength range to emit a light with a predetermined color, whereby a mixture of the lights with different wave lengths is obtained in the optical fiber.

11. The backlight module as described in claim 10, wherein the light-incident holes are defined in a bottom face of the optical fiber, and the light-emergent windows are defined in a top face of the optical fiber.

12. The backlight module as described in claim 11, wherein the top face of the optical fiber is larger than the bottom face of the optical fiber.

13. The backlight module as described in claim 11, wherein the optical fiber has a configuration like an inverted quadrangular frustum.

14. The backlight module as described in claim 10, wherein a receiving groove is defined in a top face of the back cover for accommodating a corresponding one of the light sources therein.

15. The backlight module as described in claim 10, wherein the optical fiber comprises a main body and a coating layer entirely coating an outer periphery of the main body.

16. The backlight module as described in claim 15, wherein the light-incident holes and the light-emergent windows are both defined in and extend through the coating layer of the optical fiber.

17. A backlight module comprising:
    an optical fiber on the back cover, the optical fiber having a plurality of light-emergent windows;
    a plurality of light sources covered by the optical fiber whereby light generated by the light sources enters the optical fiber;
    a plurality of light shutters correspondingly covering the light-emergent windows; and
    a controlling device being configured for controlling the light shutters to open or close, wherein light emitted from the light sources and entering the optical fiber is permitted to leave the optical fiber via the light-emergent windows whose light shutters are opened and not permitted to leave the optical fiber via the light-emergent windows whose light shutters are closed, a bottom face of the optical fiber is attached on a top face of the back cover and correspondingly faces the light source.

18. The backlight module of claim 17, wherein the light sources are embedded into the optical fiber, and wherein the light sources are located opposite to the light-emergent windows.

19. The backlight module of claim 17, wherein the light source are mounted in the back cover.

* * * * *